(No Model.) 2 Sheets—Sheet 2.
B. F. SMITH.
HAY RAKE.
No. 526,586. Patented Sept. 25, 1894.
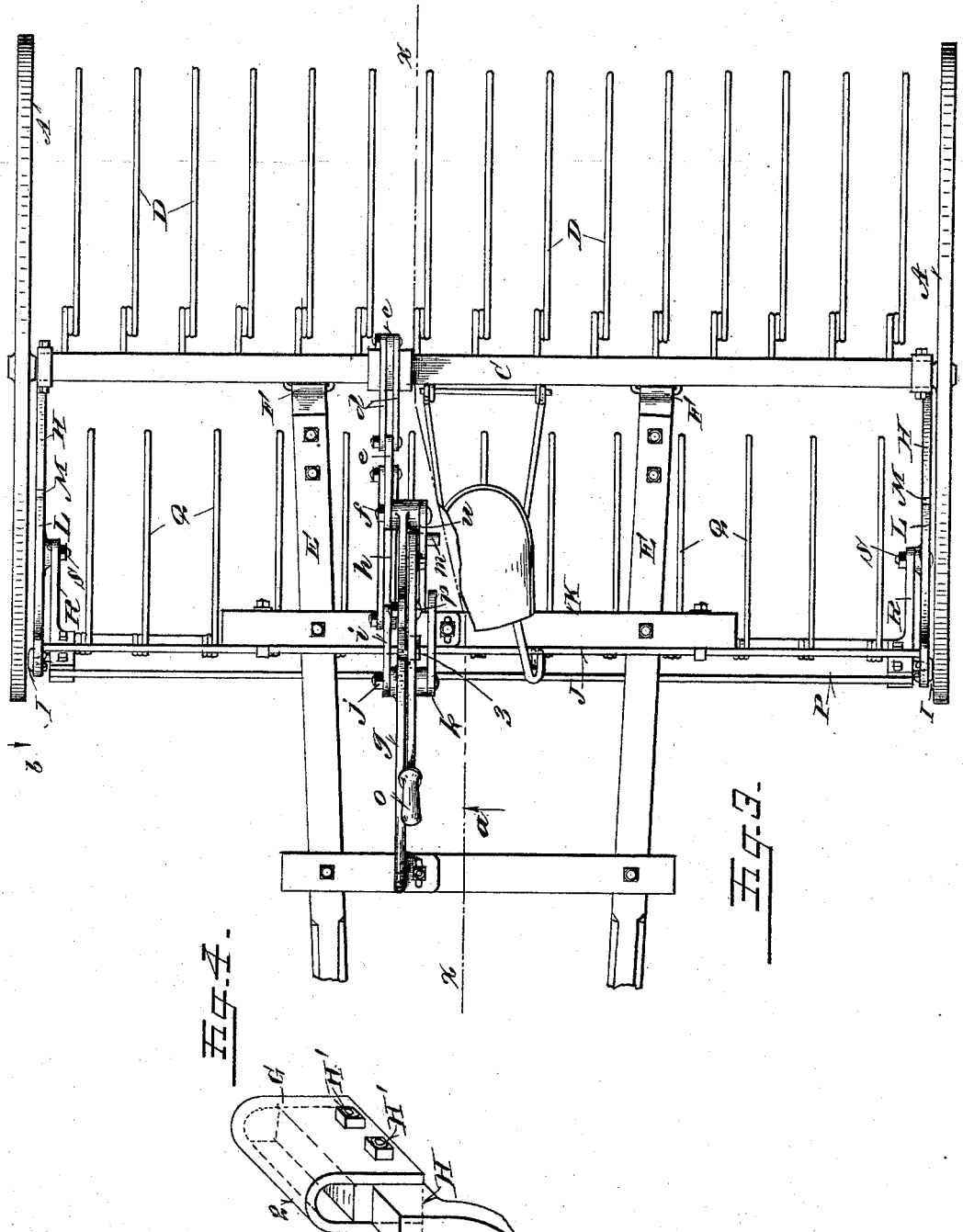

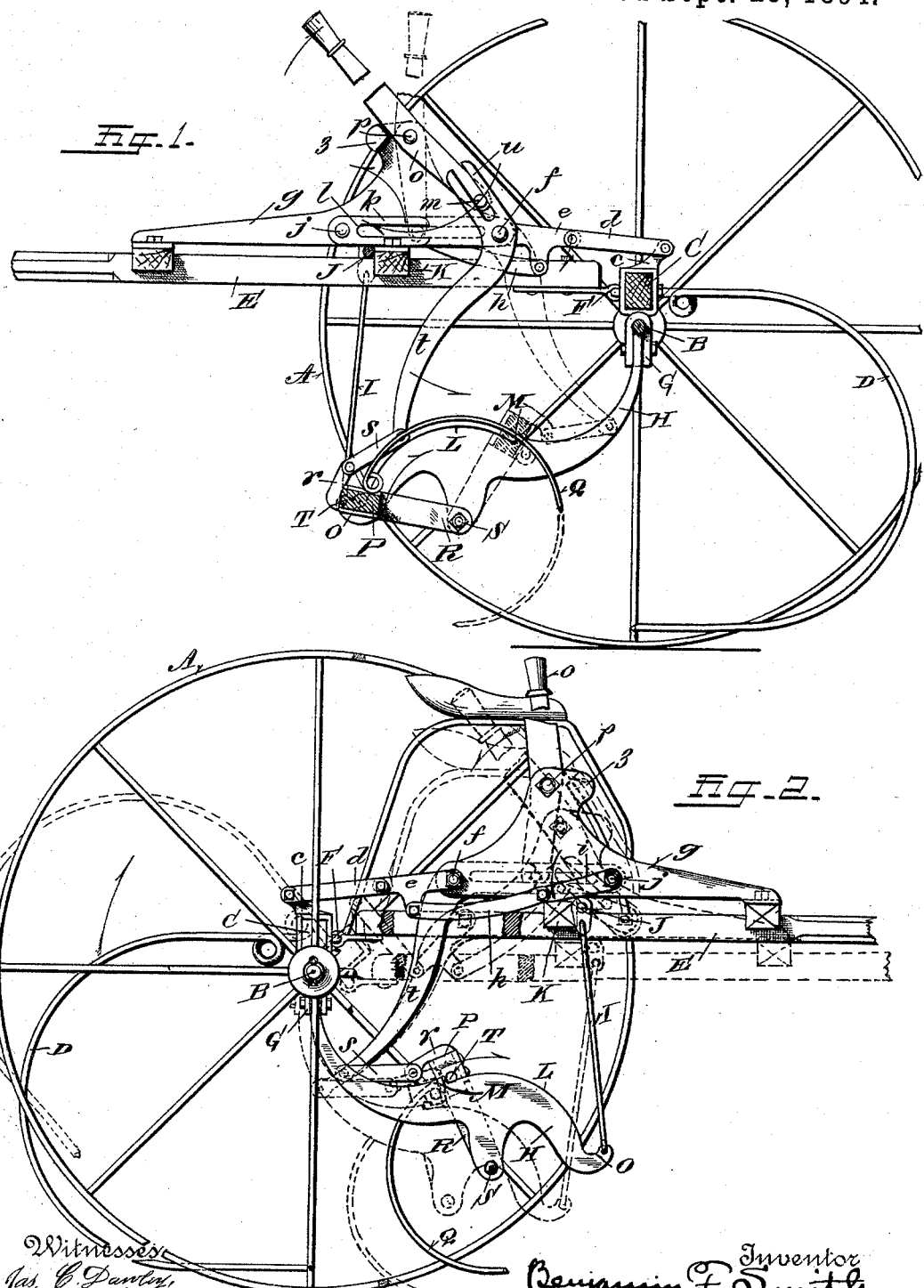

UNITED STATES PATENT OFFICE.

BENJAMIN F. SMITH, OF SPRINGFIELD, OHIO.

HAY-RAKE.

SPECIFICATION forming part of Letters Patent No. 526,586, dated September 25, 1894.

Application filed May 4, 1894. Serial No. 510,076. (No model.)

*To all whom it may concern:*

Be it known that I, BENJAMIN F. SMITH, a citizen of the United States, residing at Springfield, in the county of Clark and State of Ohio, have invented certain new and useful Improvements in Hay-Rakes, of which the following is a specification, reference being had therein to the accompanying drawings.

This invention relates to certain new and useful improvements in hay rakes.

The object of my invention is to employ but a single lever and its co-operating means to adjust and set the main tines to the ground and a set of supplemental tines to the ground in such manner that when it is desired to dump the hay gathered by the main tines, the supplemental tines can be first lowered to rake off a place upon which to dump such load, without affecting the main tines in letting down the supplemental tines; and that the main tines can then be elevated to dump such load on such cleared space, without affecting the supplemental tines, and that, finally, the main tines can descend and the supplemental tines be elevated, all these operations being performed by a single lever with its co-operating devices. I consider myself the first to accomplish this result in this manner and accordingly lay broad claim thereto.

In the accompanying drawings on which like reference letters indicate corresponding parts: Figure 1, represents a side elevation of my improved hay rake on the line $xx$ of Fig. 3 looking in the direction of the arrow $a$; Fig. 2, a side elevation with some of the parts broken away looking from the opposite side of the machine in the direction indicated by the arrow $b$; Fig. 3, a plan view of the machine, and Fig. 4, a detailed perspective view of the clip by which the hangers are secured to the axle.

The letter A designates the usual supporting wheels carrying an axle B on which is mounted the rake-head C in a manner to permit the head to be adjusted back and forth in lowering and raising the main tines D, which are secured to the head in any approved manner. The thills E are connected to the head C by a suitable joint F. Clips G fit over the axle B and have bolted to them the hangers H, which extend downward and forward and are supported at their forward ends by rods I suspended from the thills as by a cross-shaft J, secured to one of the cross beams K of the thills. These hangers H have a circular portion L, a shoulder M and a shoulder O.

The supplemental rake-head P carries the supplemental tines Q and is connected to the hangers H by arms R pivoted to the hangers at S. The head P also preferably has a stud T at each end which ride upon curved surfaces L and thus aid in supporting the head P.

I will now describe the mechanism by which the two rake-heads are manipulated so as to raise and lower the two sets of tines in the required manner at the required time. This mechanism consists, essentially, of three parts: first, two cranks and two links for the main rake-head; secondly, one crank with a rigid arm and a link for the supplemental-rake-head, and, thirdly, one lever by which one of the cranks of the main rake-head is engaged and by which the crank of the supplemental rake-head is also engaged.

To a clip $c$ on the main rake-head C is pivoted a link $d$, which in turn pivots to a crank $e$, whose pivot is at $f$ and is supported by a stout casting or plate $g$ secured to the thills. To one branch of this crank is also pivotally connected a link $h$, which at its other end is pivoted to the crank $i$, whose shaft $j$ is carried by the casting $g$. This latter crank may be said to be double in the sense that besides the specific piece $i$, there is also the specific piece $k$ carried by the shaft $j$. The piece or part $k$ of this crank is slotted as shown at $l$ for the purpose of receiving the stud $m$ of the hand lever $o$, whose pivot $p$ is also mounted in the casting $g$. Thus it will be understood that when this hand lever is operated back and forth it will actuate the crank $i$ through the slotted part $k$ and that thereby the link $h$ will actuate the crank $e$ which in turn will actuate the link $d$, which latter, in turn, operates the rake-head C to raise and lower the main tines D.

Referring now to the supplemental head P it will be seen that to a clip $r$ carried thereby, is pivoted a link $s$, which link pivots to an arm $t$ carried by and forming a part of the slotted crank $u$, mounted on the shaft $f$, above referred to. The stud $m$ of the hand-lever $o$ also works in this slotted crank $u$.

I will now describe the operation of my improved rake, particularly specifying how this adjusting mechanism operates. As the parts are shown in Fig. 1 the main tines are in position to rake. When a sufficient quantity of the hay or grass is gathered and ready to be dumped the operator takes hold of the hand lever o and moves it from the position shown in full lines in Fig. 1 to that shown in dotted lines in that figure. In doing this he will move the slotted crank u down from the position shown in full lines to that shown in dotted lines and will thereby, through the arm t and the link s adjust the head P from the position shown in full lines to that in dotted lines, whereby the supplemental tines Q will assume the dotted position and rake off a clear place upon which to dump the load accumulated in the main tines. When the main tines are to be elevated for this purpose, the operator draws the lever o back from the position shown in dotted lines in Fig. 1 to the dotted position shown in Fig. 2, whereby its stud m will pass out of the slotted crank u into the slotted part k and turn the crank upward as shown by the dotted lines in Fig. 2 at which time the main tines occupy the dump position, shown in dotted lines in that figure. Then to lower these tines the lever is moved forward from this last position so shown by the dotted lines in Fig. 2 to the full lines in that figure. This will cause the two sets of tines to stand as shown in the full lines in Fig. 2. Then by continuing the lever forward to the position shown in full lines in Fig. 1, the supplemental tines will rise to the position shown in Fig. 1 leaving the main tines down to gather another load. Thus it will be understood that by moving the hand lever from what may be called the normal position shown in full lines in Fig. 1 backward until about vertical the supplemental tines assume operating position; that by carrying the said lever still further back or to the dotted position in Fig. 2 the main tines are elevated; that by returning the lever to a nearly vertical position the main tines descend and by continuing the forward motion the supplemental tines then rise so that there are but two motions of the lever, namely, a forward motion and a backward motion and in each stroke it performs two things, namely, in traveling back it lets down the supplemental tines and lifts the main tines and in going forward it lets down the main tines, allows both tines to remain down the desired time by stopping its forward movement and then by continuing it, it lifts the supplemental tines. Referring to Fig. 4 it will be seen that a plate 2 is bent to form a clip to pass around the axle and to receive the upper end of the hanger H, bolts and nuts H' being used to secure the parts together.

In order to limit the movements of the hand lever I provide a stop 3 on the casting g, see Fig. 1, by which the lever is limited or resisted at either extreme of its movements. Any other suitable stop may be used.

Having thus fully described my invention, what I claim as new, and desire to secure by Letters Patent, is—

1. In a hay rake, the combination with the main tines and their head, and supplemental tines and their head, of a hand lever and two sets of mechanism, a set between the hand lever and the main tines and a set between the hand lever and the supplemental tines, said lever being arranged to alternately operate both of said sets of mechanism.

2. In a hay rake, the combination with the main tines and their head, and the supplemental tines and their head, of a lever, a set of mechanism between said lever and the supplemental head, another set of mechanism between said lever and the main head, the lever being arranged to alternately operate said sets of mechanism to lower the supplemental tines and elevate the main tines by one movement and to lower the main tines and elevate the supplemental tines by the other movement.

3. In a hay rake, the combination with the supplemental tines and their head and the main tines and their head, of a lever and a set of mechanism between said lever and the main head, the lever being arranged to lower the supplemental tines and elevate the main tines, by one movement, and by the next movement to lower the main tines, to allow both sets of tines to remain down by arresting this movement and to raise the supplemental tines by continuing the movement.

4. In a hay rake, the combination with the supplemental tines and their head, and the main tines and their head, of a lever, a crank, an arm, and link operated thereby and connected with the supplemental head, and two links and two cranks operated thereby and connected with the main head, the lever being adapted to pass out of operative connection with one crank and into operative connection with the other crank, and to not actuate either crank when resting at an intermediate point between the extremes of backward and forward adjustment.

5. In a hay rake, the combination with a lever and two sets of mechanism, for the purpose described, one set consisting of a bifurcated crank operating an arm, and a link carried by the arm, and the other set of a bifurcated crank operating a link, a crank operated by said link, and another link operated by said latter crank, the bifurcated portions of the cranks being arranged to stand opposite each other at a place in their movements so that the said lever can pass from one to the other to actuate them alternately.

In testimony whereof I affix my signature in presence of two witnesses.

BENJAMIN F. SMITH.

Witnesses:
OLIVER H. MILLER,
W. M. McNAIR.